June 13, 1950

F. DOSTAL 2,511,571

GRASS SHEARS

Filed May 23, 1946

INVENTOR
FRANK DOSTAL

BY
Wheeler, Wheeler & Wheeler
ATTORNEYS

Patented June 13, 1950

2,511,571

UNITED STATES PATENT OFFICE 2,511,571

GRASS SHEARS

Frank Dostal, Racine, Wis.

Application May 23, 1946, Serial No. 671,811

7 Claims. (Cl. 56—241)

This invention relates to improvements in grass shears.

It is a primary object of the invention to provide a novel and improved grass shear which may be guided, manipulated and operated by an erect operator through the medium of a handle of convenient length. More particularly, it is my purpose to provide an arrangement in which a vertical movement of the handle will cause the shear blades to close and open, while a rotative movement of the handle guides the shears and a bodily translative movement of the handle manipulates the shears from point to point.

It is another object of the invention to provide grass shears with a shoe which supports one of the shears at a predetermined spacing from the earth and receives the downward pressure of a handle movable vertically with respect to the shears whereby the movable blade is pivotally actuated against the bias of a spring with respect to the blade supported by the shoe, the spring serving to open the shears when pressure on the handle is released.

Still another object of the invention is to provide a shear operating lever system providing at least two hinged joints between a vertically reciprocable handle and a set of shears, the lever system being adapted to transmit vertical handle movement to one of the shear blades for actuation thereof, but being designed to preclude relative rotation of the handle respecting the other shear blade, whereby handle rotation is transmitted to such other shear blade for the guidance of the shears during their operation.

Other objects of the invention will be apparent to those skilled in the art upon analysis of the following disclosure.

Figure 1:
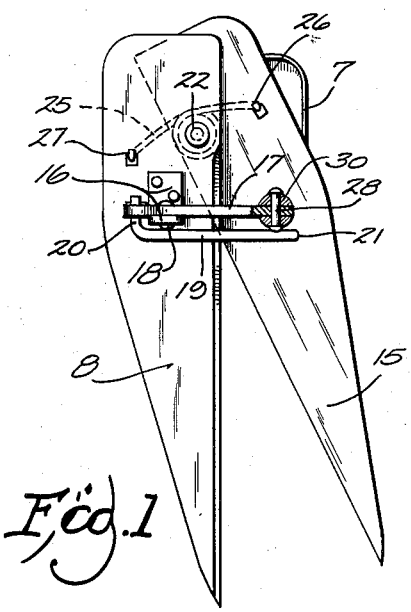
Fig. 1 is a top plan view of shears embodying my invention, the handle being shown in section.
Figure 2:
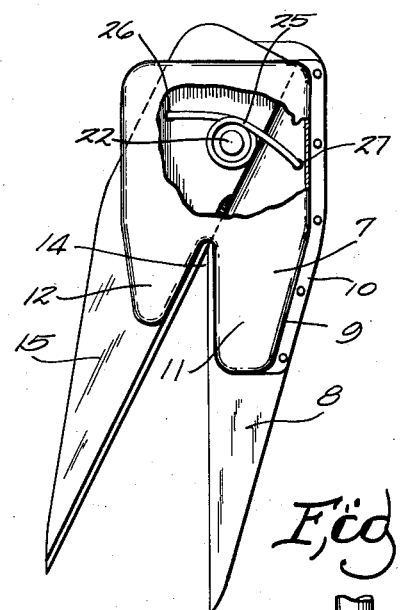
Fig. 2 is a bottom plan view of shears embodying my invention, the underlying shoe being broken away to expose a spring which biases the blades to open position.
Figure 3:
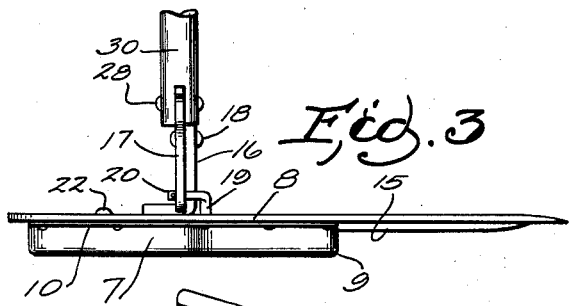
Fig. 3 is a view of my improved shear in side elevation, the handle being broken away.
Figure 4:
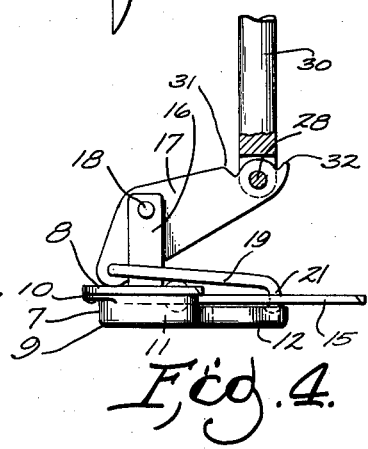
Fig. 4 is a view in front elevation of shears embodying my invention, the handle being broken away.
Figure 5:
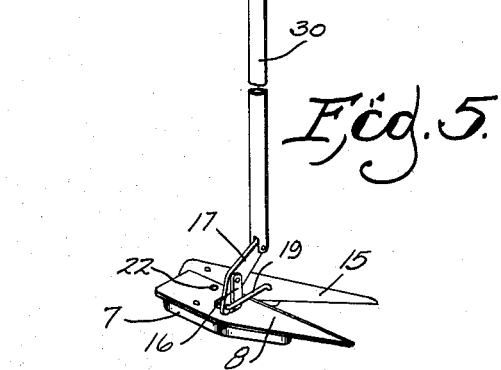
Fig. 5 is a view on a reduced scale showing the complete shears in perspective, the handle being foreshortened.

The shoe 7 is preferably made of sheet metal and has sufficient area to provide stable support for the relatively stationary shear blade 8. As shown, the shoe comprises a shallow receptacle having all of its margins rounded as indicated at 9 to facilitate movement over the earth, the receptacle being flanged at 10 for connection with the stationary blade 8. In order to increase the stability of support without interfering with the grass cutting operation, the shoe may be made in bifurcated form, as shown, having one leg 11 extending outwardly beneath blade 8 while another leg 12 extends to a somewhat lesser distance beneath the movable blade 15, the angular notch 14 between the legs 11 and 12 of the shoe being sufficiently wide to expose the angle between the cutting edges of the blades in all positions of the blades. However, the particular form of the shoe and its mode of connection with the stationary blade is of less importance than the manner in which the blades are actuated, guided and advanced in the use of the device.

For these purposes, the stationary blade 8 carries a bracket 16 to which a broad, flat lever 17 is pivoted by a rivet 18. The broad, flat faces of the lever and bracket in complementary bearing contact permit free oscillation of the lever respecting the bracket while precluding relative rotation in a horizontal plane between these parts. The link 19 has an end portion 20 turned at right angles and extended through an opening in lever 17 to provide a pivotal connection therewith. At its other end, the link 19 is provided with a downwardly turned portion 21 similarly pivoted to the movable blade 15, whereby oscillation of lever 17 in a vertical plane is communicated to effect corresponding oscillation of the movable blade 15 in a horizontal plane about the pivot 22 which connects the movable blade 15 to the relatively fixed blade 8. It is convenient but not necessary that the movable blade 15 be located beneath, rather than above, the fixed blade 8.

Guided upon the pivot 22 beneath the blade and within the shoe 7 is a spring 25 having its end portions operatively engaged at 26 and 27 with the respective blades 15 and 8. This spring biases blade 15 toward the open position in which it is illustrated in the drawings.

The free end of lever 17, which is normally held up by the torsion of spring 25, is pivotally connected by a rivet 28 with handle 30, which has one or more flat surfaces in face bearing contact with lever 17. This arrangement permits vertical movement of the handle to be communicated to the lever 17 to effect oscillation thereof and to require oscillation between the blades. At the same time, the flat bearing surfaces in contact preclude relative rotation between handle 30 and lever 17 and, since such lever is fixed against displacement in a horizontal plane respecting the blade assembly, it will be apparent that translative and rotative movements of the handle must necessarily be communicated to the blade assembly, particular reference being made to its fixed blade and its supporting shoe.

As a result of this arrangement, the handle may be used to advance the blade assembly over the earth and to guide it in the course of such advance while, at the same time that these movements are being communicated to the fixed blade, the movable blade may be oscillated in a horizontal plane by downward pressure of the handle. The bias of spring 25 returns the blade 15 to its open position when the downward pressure on the handle is relieved. While the blade assembly is such that the movable blade 15 must necessarily partake of translative and guided movements of the fixed blade, nevertheless in one sense, it will be apparent that all bodily movements of the handle either in translative or rotative directions are communicated in the first instance to the fixed blade, while all vertical reciprocation of the handle is transmitted to the movable blade.

If desired, the freedom of movement of the handle pivotally with respect to lever 17 may be restricted by shoulders 31 and 32 provided on lever 17.

In operation, the user of shears embodying this invention may stand erect and use the handle to advance the shears step by step over the earth, the shoe supporting them at the correct elevation and sustaining them during the downward thrust on the handle which follows each advance. Thus, in each new position to which the shears may be adjusted by rotative or translative manipulation of the handle, the ensuing downward thrust upon the handle operates the movable blade to coact with the fixed blade for severing grass.

I claim:

1. In grass shears, the combination with an assembly comprising a supporting shoe and a blade fixed thereon, said shoe being adapted to support said blade at an appropriate level above the earth traversed by the shears and to receive downward thrust upon said assembly, of a movable blade provided with a pivotal mounting upon which it is operatively oscillatable respecting the fixed blade, spring means between the shoe and the first mentioned blade having operative connection with the oscillatable blade for actuating it toward open position respecting the fixed blade, a single handle provided with means guiding it for vertical reciprocation respecting said assembly, said means including a motion transmitting connection from said handle to said oscillatory blade for actuating the oscillatory blade toward the fixed blade against the bias of said spring when the handle is pushed downwardly 2. In grass shears, the combination with an assembly comprising a supporting shoe and a blade fixed thereon, said shoe being adapted to support said blade at an appropriate level above the earth traversed by the shears and to receive downward thrust upon said assembly, of a movable blade provided with a pivotal mounting upon which it is operatively oscillatable respecting the fixed blade, spring means between the shoe and the first mentioned blade having operative connection with the oscillatable blade for actuating it toward open position respecting the fixed blade, a single handle provided with means guiding it for vertical reciprocation respecting said assembly, said means including a motion transmitting connection from said handle to said oscillatory blade for actuating the oscillatory blade toward the fixed blade against the bias of said spring when the handle is pushed downwardly, the handle mounting comprising means whereby rotative and bodily translative movements of said handle are communicated to said assembly for the movement and guidance thereof.

3. The device of claim 2 in which said shoe has upwardly turned margins partially enclosing said spring.

4. Grass shears comprising a shoe, a blade fixed thereon, a second blade provided with a pivotal mounting upon which it is oscillatory respecting the first blade, means biasing the second blade for oscillation in one direction upon its pivotal mounting, and a single vertically reciprocable handle provided with operative connection to said second blade for effecting oscillation thereof in opposition to its bias upon depression of said handle toward said shoe, said handle comprising the sole directional guiding element for said shears, said shoe being bifurcated and having portions extending forwardly beneath the respective blades and an intervening notch adapted to accommodate movement of grass between said blades to be severed thereby.

5. The device of claim 1 in which said assembly is provided with an upstanding bracket having a bearing surface in an upright plane and a lever is pivoted to the bracket and has one of its ends connected by a link with the oscillatory blade, the other end of the lever being pivoted to said handle and provided with a face bearing on said handle in substantially a vertical plane whereby to provide the actuating connections for the oscillatory blade while enabling the handle to be manipulated for controlling the advance and guidance of said assembly.

6. In lawn shears of the type comprising a supporting shoe and a reciprocable handle for the guidance and operation of the shears, the combination with such shoe, of a first blade fixed thereon to be positioned therewith, a fulcrum means, and a second blade pivoted for movement respecting the first blade in response to the reciprocation of such handle, said shoe and first blade together providing a chamber about said fulcrum means, and a spring in said chamber connected with the second blade for the movement thereof away from the first blade in opposition to the thrust of such handle.

7. Grass shears of the type adapted to be guided and actuated by a vertically reciprocable handle and comprising a unit immovable in the reciprocation of the handle which includes a supporting shoe and a blade fixed thereto, a pintle connected with said unit, a second blade pivoted upon the pintle for movement respecting the fixed blade, a spring confined between the shoe and fixed blade and connected with the second blade for movement thereof in an opening direction, a bracket carried by said unit provided with a side bearing surface for said handle, and a handle operable lever pivoted to said unit and provided with a link connection to the second blade for movement thereof toward the first blade under thrust of said handle.

FRANK DOSTAL.

REFERENCES CITED

The following references are of record in the file of this patent:

UNITED STATES PATENTS

| Number | Name | Date |
|---|---|---|
| 798,307 | Taylor | Aug. 29, 1905 |
| 855,587 | Pederson | June 4, 1907 |
| 1,275,307 | Saile | Aug. 13, 1918 |
| 1,741,172 | Huxman | Dec. 31, 1929 |
| 1,799,087 | Carpenter | Mar. 31, 1931 |
| 1,833,535 | Rossman | Nov. 24, 1931 |